US012548700B2

(12) United States Patent
Fujikawa et al.

(10) Patent No.: US 12,548,700 B2

(45) Date of Patent: Feb. 10, 2026

(54) R-T-B-BASED PERMANENT MAGNET AND METHOD FOR PRODUCING SAME, MOTOR, AND AUTOMOBILE

(71) Applicant: TDK CORPORATION, Tokyo (JP)

(72) Inventors: Yoshinori Fujikawa, Tokyo (JP); Reiji Yamada, Tokyo (JP)

(73) Assignee: TDK CORPORATION, Tokyo (JP)

( * ) Notice: Subject to any disclaimer, the term of this patent is extended or adjusted under 35 U.S.C. 154(b) by 561 days.

(21) Appl. No.: 17/911,760

(22) PCT Filed: Mar. 29, 2021

(86) PCT No.: PCT/JP2021/013404

§ 371 (c)(1),
(2) Date: Sep. 15, 2022

(87) PCT Pub. No.: WO2021/200873

PCT Pub. Date: Oct. 7, 2021

(65) Prior Publication Data

US 2023/0118859 A1 Apr. 20, 2023

(30) Foreign Application Priority Data

Mar. 30, 2020 (JP) ................................ 2020-060511

(51) Int. Cl.

| | |
|---|---|
| ***H01F 1/057*** | (2006.01) |
| ***B22F 3/16*** | (2006.01) |
| ***B22F 9/02*** | (2006.01) |
| ***C22C 30/02*** | (2006.01) |
| *B22F 3/24* | (2006.01) |
| *B22F 9/04* | (2006.01) |

(52) U.S. Cl.

CPC ................ *H01F 1/057* (2013.01); *B22F 3/16* (2013.01); *B22F 9/023* (2013.01); *C22C 30/02* (2013.01); *B22F 2003/242* (2013.01); *B22F 2003/247* (2013.01); *B22F 2003/248* (2013.01); *B22F 2009/044* (2013.01); *B22F 2201/11* (2013.01); *B22F 2201/20* (2013.01); *B22F 2202/05* (2013.01); *C22C 2202/02* (2013.01)

(58) Field of Classification Search

CPC . H01F 1/057; C22C 30/02; B22F 3/16; B22F 9/023

See application file for complete search history.

(56) References Cited

U.S. PATENT DOCUMENTS

| | | | | |
|---|---|---|---|---|
| 10,523,101 | B2 * | 12/2019 | Iwasaki ................ | H02K 41/031 |
| 2008/0245442 | A1 | 10/2008 | Nakamura et al. | |
| 2011/0150691 | A1 | 6/2011 | Nakamura et al. | |
| 2011/0234348 | A1 | 9/2011 | Miwa et al. | |
| 2015/0125336 | A1 | 5/2015 | Sagawa et al. | |
| 2017/0103835 | A1 | 4/2017 | Hidaka et al. | |
| 2018/0158582 | A1 | 6/2018 | Masusawa et al. | |

FOREIGN PATENT DOCUMENTS

| | | | |
|---|---|---|---|
| CN | 1570187 | A | 1/2005 |
| CN | 102237168 | A | 11/2011 |
| CN | 108154988 | A | 6/2018 |
| JP | 2017-073465 | A | 4/2017 |
| JP | 2018-093201 | A | 6/2018 |
| JP | 2018-093202 | A | 6/2018 |
| JP | 2018-174314 | A | 11/2018 |
| WO | 2006/043348 | A1 | 4/2006 |
| WO | 2014/017249 | A1 | 1/2014 |

OTHER PUBLICATIONS

English Abstract and English Machine Translation of Mazuzawa et al. (JP 2018-093201) (Jun. 14, 2018).*

Jun. 22, 2021 International Search Report issued in International Patent Application No. PCT/JP2021/013404.

Sep. 29, 2022 International Preliminary Report on Patentability issued in International Application No. PCT/JP2021/013404.

* cited by examiner

*Primary Examiner* — Jessee R Roe

(74) *Attorney, Agent, or Firm* — Oliff PLC

(57) ABSTRACT

An R-T-B-based permanent magnet which contains R that represents at least one rare earth element essentially including Tb or Dy, T that represents Fe or at least one iron-group element essentially including Fe and Co, and B that represents boron, and further contains Cu. The total content of R is 28.35 to 29.95% by mass, inclusive, the content of Cu is 0.05 to 0.40% by mass, inclusive, and the content of B is 0.93 to 1.00% by mass, inclusive. The distribution of the concentration of Tb or Dy decreases from the outside of the R-T-B-based permanent magnet toward the inside of the R-T-B-based permanent magnet.

14 Claims, 2 Drawing Sheets

R-T-B-BASED PERMANENT MAGNET AND METHOD FOR PRODUCING SAME, MOTOR, AND AUTOMOBILE

TECHNICAL FIELD

The present invention relates to an R-T-B based permanent magnet and a method for producing the R-T-B based permanent magnet, a motor, and an automobile.

BACKGROUND

A rare earth permanent magnet having an R-T-B based composition is a magnet having excellent magnetic properties, and various studies have been carried out to further improve such magnetic properties. As indicators showing the magnetic properties, a residual magnetic flux density (residual magnetization) Br and a coercivity are used. A magnet which shows high values of these indicators is considered to have excellent magnetic properties.

Patent Document 1 discloses a rare earth permanent magnet obtained by immersing a magnet body in a slurry, in which a fine powder including various rare earth elements is dispersed in water or an organic solvent, then heating to carry out a grain boundary diffusion process.

Patent Document 2 discloses an R-T-B based permanent magnet which has an improved coercivity by using Ga.

Patent Document 3 discloses a technique for obtaining a magnet having a high coercivity by reducing a carbon content without performing a dehydrogenation treatment during a coarse pulverization.

[Patent Document 1] WO2006/043348

[Patent Document 2] JPA 2018-093202

[Patent Document 3] WO2014/017249

SUMMARY

An object of the present invention is to provide an R-T-B based permanent magnet having high residual magnetic flux density Br and coercivity Hcj.

In order to achieve the above-mentioned object, an R-T-B based permanent magnet according to the first aspect of the present invention is an R-T-B based permanent magnet in which R represents one or more rare earth elements which essentially includes Tb or Dy, T represents one or more iron group elements which essentially includes Fe or a combination of Fe and Co, and B represents boron; wherein

- the R-T-B based permanent magnet further includes Cu,
- a total content of R is within a range of 28.35 mass % or more and 29.95 mass % or less,
- a content of Cu is within a range of 0.05 mass % or more and 0.40 mass % or less,
- a content of B is within a range of 0.93 mass % or more and 1.00 mass % or less,
- a concentration distribution of Tb or Dy decreases from a surface area towards an inside of the R-T-B based permanent magnet,
- a residual magnetic flux density is 1485 mT or more, and
- a coercivity is 1800 kA/m or more.

When the R-T-B based permanent magnet according to the first aspect of the present invention satisfies the above-mentioned constitutions, a magnet having high residual magnetic flux density and coercivity is obtained; more specifically, a magnet having a residual magnetic density of 1485 mT or more and a coercivity of 1800 kA/m or more is obtained.

R may be one or more rare earth elements which essentially include Tb.

The R-T-B based permanent magnet may include C in a content of less than 750 ppm.

The R-T-B based permanent magnet may include N in a content of less than 500 ppm.

The R-T-B based permanent magnet may include O in a content of less than 650 ppm.

The R-T-B based permanent magnet may include one or more light rare earth elements, and a concentration distribution of the one or more light rare earth elements decreases from the surface area towards the inside of the R-T-B based permanent magnet.

A concentration distribution of Cu in the R-T-B based permanent magnet may decrease from the surface area to the inside of the R-T-B based permanent magnet.

The R-T-B based permanent magnet may further include Al, and a concentration distribution of Al may decrease from the surface area to the inside of the R-T-B based permanent magnet.

The R-T-B based permanent magnet may further include Co, and a concentration distribution of Co may decrease from the surface area to the inside of the R-T-B based permanent magnet.

The R-T-B based permanent magnet may further include Ga, and a concentration distribution of Ga may decrease from the surface area to the inside of the R-T-B based permanent magnet.

A motor according to the present invention includes the above-mentioned R-T-B based permanent magnet.

An automobile according to the present invention includes the above-mentioned motor.

An R-T-B based permanent magnet according to the second aspect of the present invention is an R-T-B based permanent magnet in which R represents one or more rare earth elements which essentially includes a light rare earth element, T represents one or more iron group elements which essentially includes Fe or a combination of and Co, and B represents boron; wherein

- the R-T-B based permanent magnet further includes Cu,
- a total content of the light rare earth element is within a range of 27.95 mass % or more and 29.55 mass % or less,
- a content of Cu is within a range of 0.05 mass % or more and 0.40 mass % or less, and
- a content of B is within a range of 0.93 mass % or more and 1.00 mass % or less; and
- the R-T-B based permanent magnet includes
- C in a content of less than 750 ppm,
- N in a content of less than 500 ppm, and
- O in a content of less than 650 ppm.

When the R-T-B based permanent magnet according to the second aspect of the present invention satisfies the above-mentioned constitutions, the R-T-B based permanent magnet with significantly improved magnetic properties due to a grain boundary diffusion process is obtained.

A method for producing an R-T-B based permanent magnet according to the present invention includes steps of

- storing hydrogen to a raw material alloy, and
- dehydrogenating the raw material alloy storing hydrogen; in which
- the raw material alloy storing hydrogen is dehydrogenated under a dehydrogenating temperature within a range of 50° C. or higher and 200° C. or lower for a dehydrogenating time of 5 minutes or longer and 600 minutes or shorter.

A content of hydrogen included in a coarse powder obtained by dehydrogenating the raw material alloy storing hydrogen may be within a range of 2100 ppm or more and 3100 ppm or less.

DETAILED DESCRIPTION

Hereinafter, the present invention is described in detail based on the embodiments shown in the figures.

<R-T-B Based Permanent Magnet>

An R-T-B based permanent magnet 1 according to the present embodiment includes main phase grains made of $R_2T_{14}B$ crystals and grain boundaries. The grain boundaries may include sub-phases which are parts other than the main phase grains.

Also, a main phase grain volume fraction in the R-T-B based permanent magnet is preferably 95.0% or more. By having the main phase grain volume fraction within the above-mentioned range, the magnetic properties tend to improve easily. Specifically, the R-T-B based permanent magnet after the grain boundary diffusion is cut and observed using SEM, and an area fraction of the main phase grains in the observation field is considered equivalent of the main phase grain volume fraction, thereby the main phase grain fraction is measured. For the observation using SEM, the observation field is set to a size which includes at least 200 main phase grains under 1000× to 3000× magnification. Then, ten of such observation fields are set, a main phase grain volume fraction of each observation field is measured, and an average of the obtained main phase grain volume fractions is calculated, thereby the main phase grain volume fraction of the present embodiment can be measured.

The R-T-B based permanent magnet 1 may be in any shape.

By including a plurality of specific elements each within specific range of content, the R-T-B based permanent magnet 1 according to the present embodiment can attain improved residual magnetic flux density Br and coercivity Hcj. Specifically, Br of 1485 mT or more and Hcj of 1800 kA/m or more can be attained.

Also, in the R-T-B based permanent magnet 1 according to the present embodiment, a concentration of Tb or Dy has distributions which decreases from the surface area towards the inside of the R-T-B based permanent magnet 1. Hereinbelow, the case of Tb concentration which decreases from the surface area towards the inside of the R-T-B based permanent magnet 1 is described, and same applies in case parts of or all of Tb is replaced with Dy. Note that, Tb may be preferably included rather than Dy since Tb tends to easily improve Hcj.

Figure 1:
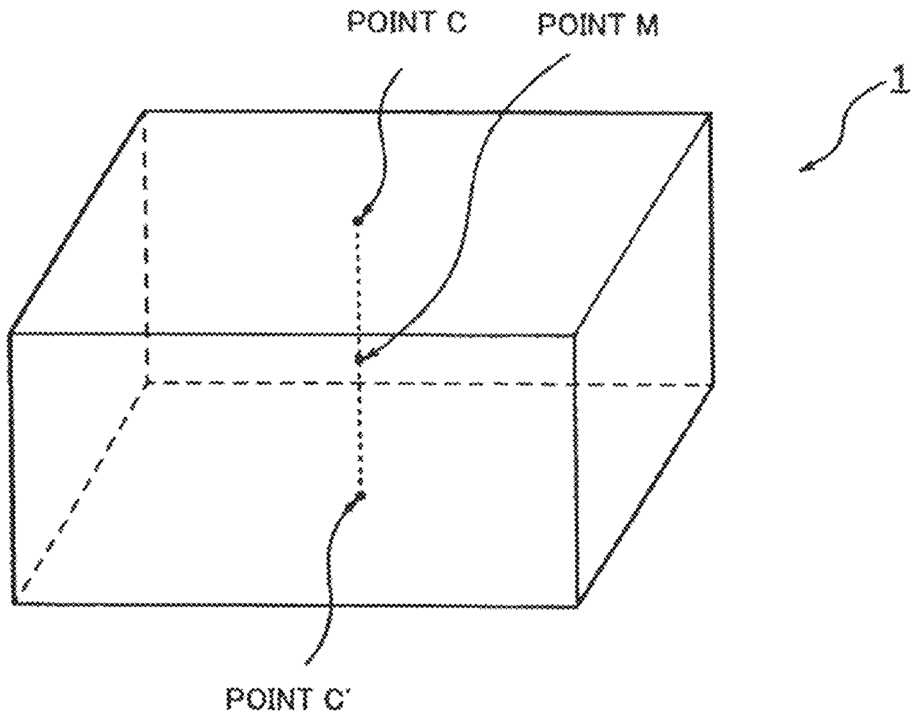
FIG. 1 is a schematic diagram of an R-T-B based permanent magnet according to an exemplary embodiment.

Specifically, as shown in FIG. 1, in case the R-T-B based permanent magnet 1 of a rectangular parallelepiped shape according to the present embodiment has the surface area and the center area, the content of Tb in the surface area can be higher by 2% or more, 5% or more, or 10% or more than the content of Tb in the center area. Note that, the surface area means the surface of the R-T-B based permanent magnet 1. For example, "POINT C" and "POINT C" shown in FIG. 1 (the center of gravity on the surfaces facing each other in FIG. 1) are the surface area. The center area means the center of the R-T-B based permanent magnet 1. For example, the center area may be the part at the depth which is half the thickness of the R-T-B based permanent magnet 1. For instance, "POINT M" of FIG. 1 is the center area (the middle point between the POINT C and POINT C').

Also, the R-T-B based permanent magnet 1 according to the present embodiment includes one or more light rare earth elements as R, and the concentration of the one or more light rare earth elements may decrease from the surface area towards the inside of the R-T-B based permanent magnet 1. Also, the concentration of Cu may decrease from the surface area towards the inside of the R-T-B based permanent magnet 1.

A method of forming such distribution of Tb concentration is not particularly limited, and such distribution of Tb concentration may be formed inside the magnet using a grain boundary distribution of Tb. Also, regarding the concentration of one or more light rare earth elements, the concentration of Cu, the concentration of Al, the concentration of Co, and the concentration of Ga; the concentration distributions of these elements may be formed by including these elements in a diffusion material when carrying out a grain boundary diffusion of Tb. Details will be described in below. The types of the light rare earth elements are not particularly limited. For example, it may be Nd and/or Pr, or it may be Nd only.

R may be one or more rare earth elements. Note that, the rare earth elements include Sc, Y, and lanthanoid elements, which belong to a third group of a long period type periodic table. For example, lanthanoid elements include La, Ce, Pr, Nd, Sm, Eu, Gd, Tb, Dy, Ho, Er, Tm, Yb, Lu, and so on. Also, the R-T-B based permanent magnet according to the present embodiment includes Tb as R. As discussed in above, part of or all of Tb may be replaced with Dy. Also, preferably Nd may be included as R.

Generally, a rare earth element is classified into light rare earth elements and heavy rare earth elements. In the R-T-B based permanent magnet according to the present embodiment, the light rare earth elements may include Sc, Y, La, Ce, Pr, Nd, Sm, and Eu; and the heavy rare earth elements may include Gd, Tb, Dy, Ho, Er, Tm, Yb, and Lu.

T represents one or more iron group elements which essentially includes Fe or a combination of Fe and Co. The iron group elements may include Fe, Co, and Ni.

B represents boron.

The R-T-B based permanent magnet according to the present embodiment may further include Cu, Al, Ga, Zr, O, C, and N.

Hereinbelow, a composition of the R-T-B based permanent magnet according to the present embodiment is described, and a denominator for calculating a content of each element is the magnet as a whole, unless mentioned otherwise.

The total content of R is within a range of 28.35 mass % or more and 29.95 mass % or less. When the total content of R is less than 28.35 mass %, then Hcj decreases. When the total content of R is more than 29.95 mass %, then Br decreases. Also, the total content of R may be within a range of 28.75 mass % or more and 29.95 mass % or less.

In case the total content of the light rare earth elements is represented by TRL, it may be within a range of 27.95 mass % or more and 29.55 mass % or less, and within a range of 28.35 mass % or more and 29.55 mass % or less. When TRL is within such range, Br and Hcj can be improved even more.

As the above-mentioned light rare earth elements, at least Nd and/or Pr may be included.

Also, the heavy rare earth elements may be included in a total content of 1.0 mass % or less. When the total content of the heavy rare earth elements is 1.0 mass % or less, a good Br tends to be maintained easily. As the heavy rare earth elements, it may be substantially only Tb. In such case, the content of Tb may be within a range of 0.20 mass % or more and 1.0 mass % or less, or within a range of 0.40 mass % or more and 0.65 mass % or less. When the content of Tb is less than 0.20 mass %, then Hcj tends to decrease easily. When the content of Tb is more than 1.0 mass %, then Br tends to decrease easily.

In the present embodiment, since the total content of R is relatively low, an increased Br is expected. However, when the total content of R is too low, a sintering property may decrease, thus if the magnet is not thoroughly sintered. Hcj may decrease significantly.

The content of Co is not particularly limited. It may be within a range of 0 mass % or more and 2.0 mass % or less. That is. Co may not be included. The content of Co may be within a range of 0.5 mass % or more and 1.5 mass % or less. When the content of Co is within such range, Br tends to increase easily. Note that, in the present embodiment, even when the content of Co is too low and also even when Co is not included, a sufficient corrosion resistance can be easily ensured. This is because the total content of R is relatively low.

The content of Ni is not particularly limited, and it may not be included. For example, the content of Ni may be within a range of 0.5 mass % or less.

The content of B may be within a range of 0.93 mass % or more and 1.00 mass % or less. It may also be within a range of 0.93 mass % or more and 0.99 mass % or less, or within a range of 0.95 mass % or more and 0.98 mass % or less. In case the content of B is too high or in case it is too low, the subphases tend to increase easily, and it becomes difficult to increase Br. When the content of B is within the above-mentioned range, Br and Hcj can be further improved.

The content of Cu is within a range of 0.05 mass % or more and 0.40 mass % or less. When the content of Cu is less than 0.05 mass %, Br and Hcj tend to decrease. When the content of Cu is more than 0.40 mass %, Br tend to decrease. Also, the content of Cu may be within a range of 0.06 mass % or more and 0.30 mass % or less, or may be within a range of 0.06 mass % or more and 0.20 mass % or less. By including 0.06 mass % or more of Cu, the properties tend to less vary. That is, a production stability tends to improve.

The content of Ga is not particularly limited. The content of Ga may be within a range of 0 mass % or more and 0.05 mass % or less. That is, Ga may not be included. The larger the content of Ga is, the easier it is for Br to decrease. This is because the larger the content of Ga is, the volume fraction of the main phase grains tends to decrease easier. Conventionally, a magnet having a low content of B and a high content of Ga is known, and in such magnet, Br tends to decrease easily compared to the R-T-B based permanent magnet according to the present embodiment.

The content of Al is not particularly limited. The content of Al may be within a range of 0 mass % or more and 0.30 mass % or less. That is, Al may not be included. The content of Al may be within a range of 0.06 mass % or more and 0.30 mass % or less.

The content of Zr is not particularly limited. It may be within a range of 0 mass % or more and 0.40 mass % or less. That is, Zr may not be included. The content of Zr may be within a range of 0.05 mass % or more and 0.40 mass % or less, or may be within a range of 0.10 mass % or more and 0.75 mass % or less. When the content of Zr is within the above-mentioned range, Br and Hcj tend to increase easily. The smaller the content of Zr is, the easier it is for Hcj to decrease. The larger the content of Zr is, the easier it is for Br to decrease.

The content of C is not particularly limited. It may be 1000 ppm or less, 790 ppm or less, or 750 ppm or less. When the content of C is within the above-mentioned range, Br and Hcj tend to improve easily. Carbon may not be included; however, it is difficult to produce an R-T-B based permanent magnet with a low content of C, and this could cause increase in costs. The content of C may be 250 ppm or more, or 450 ppm or more.

The content of N is not particularly limited. It may be 900 ppm or less, 540 ppm or less, or 500 ppm or less. When the content of N is within the above-mentioned range, Br and Hcj tend to improve easily. Nitrogen may not be included; however, it is difficult to produce an R-T-B based permanent magnet with a low content of N and this could cause increase in costs. The content of N may be 150 ppm or more, or 210 ppm or more.

The content of O is not particularly limited. It may be within a range of 1000 ppm or less, 700 ppm or less, or 650 ppm or less. When the content of O is within the above-mentioned range, Br and Hcj tend to improve easily. Oxygen may not be included; however, it is difficult to produce an R-T-B based permanent magnet with a low content of O, and this could cause increase in costs. The content of O may be 350 ppm or more, or 590 ppm or more.

The content of Fe is not particularly limited. Fe may be a substantial remainder of the R-T-B based permanent magnet. Here, "Fe may be the substantial remainder" means that the total content of elements other than Fe and the above-mentioned elements is 5 mass % or less, that is the total content of the elements other than R, Fe, Co, Ni, Cu, Al, Ga, Zr, 0, C, and N, is 5 mass % or less. The total content of the elements other than Fe and the above-mentioned elements may be 1 mass % or less, or it may be 0.1 mass % or less.

Note that, for measuring various elements included in the R-T-B based permanent magnet according to the present embodiment, a conventionally and generally known method can be used. Contents of various elements may be measured, for example, using a fluorescence X-ray analysis, an inductively coupling plasma analysis (ICP analysis), and so on. The content of O is measured, for example, using an inert gas fusion—non-dispersive infrared absorption method. The content of C is measured, for example, using a combustion in oxygen stream-infrared absorption method. The content of N is measured, for example, using an inert gas fusion-thermal conductivity method.

Also, the R-T-B based permanent magnet according to the present embodiment includes main phase grains and grain boundaries. The main phase grain may be a core-shell grain having a core and a shell covering the core. Further, the heavy rare earth elements may at least exist in the shell, or Tb may at least exist in the shell.

By including the heavy rare earth elements in the shell, the magnetic properties of the R-T-B based permanent magnet can be improved efficiently.

In the present embodiment, the shell is defined as an area where a ratio of the heavy rare earth elements to the light rare earth elements (the heavy rare earth elements/the light rare earth elements (molar ratio)) is twice or more of said ratio at the main phase grain center part (core).

A thickness of the shell is not particularly limited, and it may be 100 nm or less, or 500 nm or less. A particle size of the main phase grain is not particularly limited, and it may be within a range of 2.5 μm or more and 6.0 μm or less.

A method of producing the main phase grain in a form of the above-mentioned core-shell grain is not particularly limited. For example, a method using the grain boundary diffusion as described in below may be mentioned. As the heavy rare earth elements diffuse to the grain boundaries and the heavy rare earth elements replace the rare earth element R at the surface of the main phase grain, the shell with a high proportion of the heavy rare earth elements is formed, and the above-mentioned core-shell grain is formed.

Hereinbelow, a method for producing the R-T-B based permanent magnet according to the present embodiment is described, however, the method for producing the R-T-B based permanent magnet is not limited thereto, and other known methods may be used as well

[Preparation Step of Raw Material Powder]

A raw material powder can be prepared using a known method. In the present embodiment, a method of using a one-alloy method which uses single type of alloy is described, however, a raw material powder may be produced using a two-alloy method which mixes a first alloy and a second alloy having different compositions.

First, a raw material alloy of the R-T-B based permanent magnet is prepared (alloy preparation step). During the alloy preparation step, raw material metals corresponding to the composition of the R-T-B based permanent magnet are melted using a known method, then the melted raw material metals are casted. Thereby, the raw material alloy having the desired composition is produced.

As the raw material metals, for example, rare earth metals or a rare earth alloy; metals such as pure iron, ferroboron, Co, Cu; and alloy and compound of these may be used. A casting method for casting the raw material alloy from the raw material metals is not particularly limited. From the point of obtaining an R-T-B based permanent magnet with high magnetic properties, a strip casting method may be used.

After the raw material alloy is produced, pulverization is carried out (pulverization step). In below, the pulverization step which performs the pulverization in two steps is described, that is, the pulverization step which includes a coarse pulverization step pulverizing until a particle size is within a range of several hundred μm to several mm or so, and a fine pulverization step pulverizing until a particle size is several μm or so.

During the coarse pulverization step, the pulverization is carried out until the particle size is within a range of several hundred μm to several mm or so. Thereby, a coarse powder is obtained. In the present embodiment, the coarse pulverization is carried out using a hydrogen storage pulverization A hydrogen storage pulverization is a process which pulverizes the raw material alloy by storing hydrogen in the raw material alloy and then carrying out a dehydrogenation treatment.

Further, when the stored hydrogen is dehydrogenated from the raw material alloy, the present embodiment has a lower temperature and a shorter time as dehydrogenation conditions compared to those of a conventional method. Due to such dehydrogenation conditions, dehydrogenation is not necessarily sufficient, and hydrogen (H) is intentionally left in the coarse powder. Specifically, a dehydrogenation temperature may be within a range of 50° C. or higher and 200° C. or lower, a dehydrogenation time may be within a range of 5 minutes or longer and 600 minutes or shorter. Preferably, the dehydrogenation time may also be within a range of 5 minutes or longer and 120 minutes or shorter, or more preferably within a range of 5 minutes or longer and 30 minutes or shorter.

When the total content of R is relatively low as in case of the present embodiment, a content of each of O, C, and N included in the magnet obtained at the end tends to be low. O, C, and N tend to bond with R included in grain boundaries rather than bonding with R included in the main phase grains, and then these elements tend to remain in the obtained magnet. When the total content of R is low, the amount of R bonding with (i), C, and N is reduced, thus the content of each of O, C, and N in the obtained magnet tends to be low.

Here, by intentionally leaving H in the coarse powder, R further tends to bond with H. As a result, the amount of R available to bond with O, C, and N is reduced, thus each content of O, C, and N which remain in the obtained magnet tend to further decrease. The content of H included in the coarse powder is not particularly limited, and it may be within a range of 2100 ppm or more and 3100 ppm or less.

Regarding a conventional sintered magnet which is produced by performing compression molding, it becomes easy to oxidize the pulverized powder if a dehydrogenation treatment is not thoroughly carried out at this stage, thus the magnetic properties of the magnet obtained at the end tend to decrease easily. However, by relatively reducing the total content of R, oxidation of the pulverized powder is suppressed even if a dehydrogenation treatment is not thoroughly carried out, thus excellent magnetic properties can be attained after the grain boundary diffusion.

Note that, the dehydrogenation treatment may not be carried out, however, by performing the dehydrogenation treatment at a low temperature for a short period of time, a magnet having even higher magnetic properties tends to be obtained easily. Also, in case the dehydrogenation treatment is not carried out, the hydrogen content after the coarse pulverization becomes too high, hence cracks tend to easily occur during sintering.

Further, by regulating a nitrogen gas concentration in an atmosphere during the hydrogenation treatment, the content of N included in the R-T-B based permanent magnet can be further regulated. Also, by regulating an oxygen gas concentration in an atmosphere during the hydrogenation treatment, the content of O included in the R-T-B based permanent magnet can be further regulated. Specifically, the nitrogen gas concentration in the atmosphere may preferably be 50 ppm or less, and the oxygen gas concentration in the atmosphere may be 50 ppm or less.

Also, by regulating the oxygen gas concentration in the atmosphere from the pulverization step to a sintering step to 100 ppm or less, the content of O included in the R-T-B based permanent magnet can be reduced.

Next, the obtained coarse powder is finely pulverized until an average particle size is several μm or so (fine pulverization step). Thereby, a fine powder (raw material powder) is obtained. The average particle size of the fine powder may be within a range of 2 μm or more and 5 μm or less. Also, by regulating the nitrogen gas concentration in the atmosphere during the fine pulverization step, the content of nitrogen included in the R-T-B based permanent magnet can be regulated.

A method of fine pulverization is not particularly limited. For example, a method of using various fine pulverizers may be mentioned.

When carrying out the fine pulverization of the coarse powder, by adding various pulverization aids such as lauric amide, oleic amide, and the like, the fine powder having a high orientation during molding can be obtained. Also, by changing the added amount of the pulverization aid, the carbon content included in the R-T-B based permanent magnet can be regulated.

[Molding Step]

In the molding step, the above-mentioned fine powder is molded into a desired shape. A method of molding is not particularly limited, in the present embodiment, the fine powder is placed in a mold, and pressure is applied in a magnetic field. In the obtained molded body obtained as such, the main phase grains are oriented in a specific direction, thus the R-T-B based permanent magnet having an even higher residual magnetic flux density Br can be obtained.

The molding step may be carried out by applying pressure of 20 MPa to 300 MPa. The magnetic field applied may be 950 kA/m or more, or within a range of 950 kA/m to 1600 kA/m. The applied magnetic field is not limited to a static magnetic field, and it can be a pulse magnetic field. Also, the static magnetic field and the pulse magnetic field can be used together.

Note that, as a method of molding, a dry molding method may be used which directly molds the fine powder as described in above, and also a wet molding method may be used which molds a slurry including the fine powder dispersed in a solvent such as oil.

A shape of the molded body obtained by molding the fine powder is not particularly limited. Also, a density of the molded body at this point is within a range of 4.0 $Mg/m^3$ to 4.3 $Mg/m^3$.

[Sintering Step]

A sintering step is a process of obtaining a sintered body by sintering the molded body in a vacuum or inert gas atmosphere. A sintering temperature may need to be adjusted depending on various conditions such as a composition, a pulverization method, an average particle size, a particle size distribution, and the like. For example, sintering is carried out by heating the molded body in a vacuum or inert gas atmosphere at 1000° C. or higher and 1200° C. or lower for one hour or longer to 20 hours or shorter. Thereby, a sintered body with high density is obtained. In the present embodiment, a sintered body having a density of at least 7.45 $Mg/m^3$ is obtained. The density of the sintered body may be 7.50 $Mg/m^3$ or more.

[Aging Treatment Step]

An aging treatment step is a process in which the sintered body is heat treated at a temperature lower than the sintering temperature. The aging treatment step may or may not be performed, and a number of times of carrying out the aging treatment step is not particularly limited. The aging treatment step is carried out depending on the desired magnetic properties. Also, the below described grain boundary diffusion step may function as the aging treatment step. For the R-T-B based permanent magnet according to the present embodiment, the aging treatment step is carried out twice.

The aging treatment step of the first time is defined as a first aging step, and the aging treatment step of the second time is defined as a second aging step. Further, an aging temperature of the first aging step is defined as T1, and an aging temperature of the second aging step is defined as T2.

The temperature T1 and the aging time of the first aging step are not particularly limited. The temperature T1 may be within a range of 700° C. or higher and 900° C. or lower, and the aging time may be 1 hour to 10 hours.

The temperature T2 and the aging time of the first aging step are not particularly limited. The temperature 12 may be within a range of 500° C. or higher and 700° C. or lower, and the aging time may be 1 hour to 10 hours.

By carrying out such aging treatments, the magnetic properties, particularly Hcj, of the R-T-B based permanent magnet obtained at the end can be improved.

The R-T-B based permanent magnet obtained at this point has lower magnetic properties compared to a conventional R-T-B based permanent magnet which is not carried out with the grain boundary diffusion step. However, when Tb is grain boundary diffused by the grain boundary diffusion described in below, Hcj increases significantly. Furthermore, the R-T-B based permanent magnet, in which Tb is grain boundary diffused, has higher magnetic properties compared to a conventional R-T-B based permanent magnet, in which Tb is grain boundary diffused.

Note that, the composition of the R-T-B based permanent magnet obtained at this point is not particularly limited. For example, it may be an R-T-B based permanent magnet in which R represents one or more rare earth elements which essentially includes a light rare earth element, T represents one or more iron group elements which essentially includes Fe or a combination of Fe and Co, and B represents boron; wherein the R-T-B based permanent magnet may further include Cu, a total content of the light rare earth element may be within a range of 27.95 mass % or more and 29.55 mass % or less, a content of Cu may be within a range of 0.05 mass % or more and 0.40 mass % or less, and a content of B may be within a range of 0.93 mass % or more and 1.00 mass % or less; and the R-T-B based permanent magnet may include C in a content of less than 750 ppm, N in a content of less than 500 ppm, and O in a content of less than 650 ppm.

In the present embodiment, the content of R is relatively low in the magnet prior to grain boundary diffusion. Thereby, the composition of the magnet as a whole becomes close to a stoichiometric ratio of $R_2T_{14}B$. As a result, only a small amount of R is included in part other than $R_2T_{14}B$ main phase grains. Also, each content of O, C, and N is also relatively low. Hence, it becomes difficult to form bonds between R and O, R and C, and R and N. That is, subphases, which are parts other than main phase grains, are hardly formed. Also, since a ratio of the active rare earth elements increases, a sufficient sintering property is attained even when the content of R is relatively low.

Figure 2:
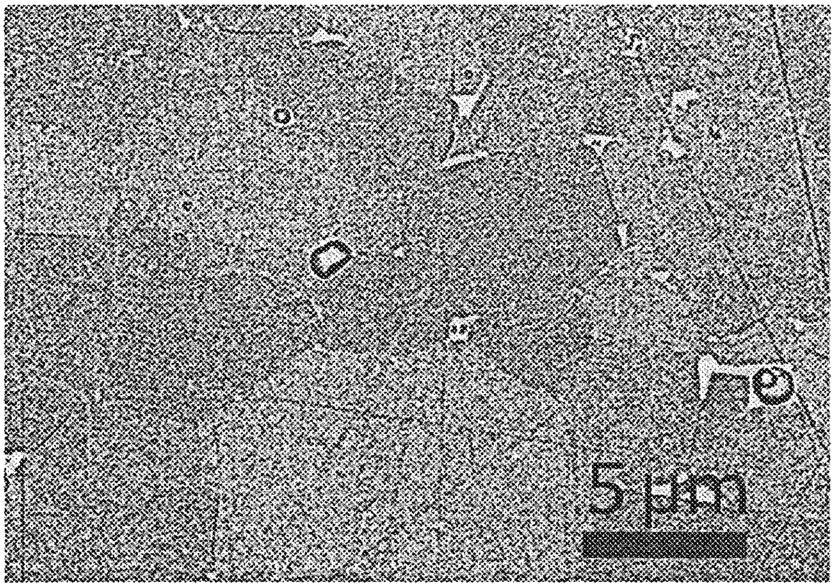
FIG. 2 is a SEM image of the R-T-B based permanent magnet prior to a grain boundary diffusion process.

According to the present embodiment, in the magnet prior to the grain boundary diffusion, a proportion of the main phase grains increases, and the proportion of the subphases, which are parts other than the main phase grains, decreases. Further, the proportion of the grain boundaries decreases. FIG. 2 shows a SEM image obtained using SEM by observing the magnet prior to the gain boundary diffusion. The R-T-B based permanent magnet of the present embodiment has a smaller triple junction, and also has an extremely thin two-grain boundary phase compared to the conventional R-T-B based permanent magnet. Further, there are some areas which appear as if the main phase grains are connected with each other without having the two-grain boundary phase between the main phase grains. Specifically, an average thickness of the two-grain boundary phases may be 5 nm or less, or it may be 2 nm or less. Also, Hcj of the R-T-B based permanent magnet at this point is significantly low compared to Hcj of a conventional magnet prior to the grain boundary diffusion.

However, when the grain boundary diffusion is carried out to the magnet before the grain boundary diffusion using a diffusion material including Tb, then Hcj increases significantly. Further, since the proportion of the subphases is small, the magnet having a high Br tends to be obtained easily.

This is because the diffusing material is thoroughly diffused even if the two-grain boundary phase is thin. The diffusion material is thoroughly diffused because the segregation of the diffusion material into the subphases and into the triple junction is reduced since the proportion of the subphases and the size of the triple junction are small, and also because the proportion of the active rare earth elements are large as mentioned in above. Also, since the total content of R is relatively low, dissolving of a main phase grain caused by the grain boundary diffusion is suppressed. As a result, in the main phase grain having a core-shell structure after the grain boundary diffusion, the thickness of the shell including Tb becomes thin. Consequently, the concentration of Tb in the shell increases. Thus, an effect of improving Hcj caused by Tb diffusion is increased, hence Hcj improves significantly.

In below, a method of performing grain boundary diffusion of Tb to the sintered body which is the obtained R-T-B based permanent magnet is described.

[Machining Step (Before Grain Boundary Diffusion)]

If necessary, the R-T-B based permanent magnet according to the present embodiment may be machined into a desired shape before the grain boundary diffusion if necessary. A machining method may be, for example, shape processing such as cutting and grinding; and chamfering processing such as barrel polishing.

[Grain Boundary Diffusion Step]

The diffusing material which includes the heavy rare earth element metals, a compound including the heavy rare earth elements, alloy including the heavy rare earth elements and so on, is applied or deposited to the surface of the R-T-B based permanent magnet, and then a heat treatment is carried out; thereby the grain boundary diffusion is performed. Note that, the heavy rare earth element used in the present embodiment is Tb. Due to the grain boundary diffusion of the heavy rare earth element, Hcj of the R-T-B based permanent magnet obtained at the end can be further improved. The heavy rare earth element which is grain boundary diffused to the sintered body may preferably be Tb. By using Tb, even higher Hcj can be attained.

In the embodiment described in below, a paste containing Tb as the diffusing material is produced, then this paste is coated on the surface of the R-T-B based permanent magnet.

The paste used is not particularly limited. The compound including Tb is not particularly limited. A solvent and a dispersion medium are also not particularly limited. Also, a concentration of Tb in the paste is not particularly limited. In below, an example of a method of producing the paste is described.

First, a raw material metal of the diffusing material is prepared. As the raw material metal of the diffusing material, Tb is prepared. The raw material metal of the diffusing material may be Tb only, or the diffusing material including raw material metals including Tb may be prepared as well. As the raw material metals of the diffusing material other than Tb, for example, light rare earth elements (such as Nd, Pr, and so on), Cu, Co, Fe, Al, Ga, and Dy may be prepared; Nd, Cu, Co, and Pr may be prepared. Particularly, Nd and Cu may be used as the diffusing material together with Tb, Next, the raw material metal(s) of the diffusing material is melted using high frequency induction heating, then the obtained molten is quenched using a roll. Thereby, a raw material alloy of the diffusing material which is a quenched ribbon is produced. The obtained quenched ribbon is coarse pulverized using a stamp mill in a glovebox in which the atmosphere is replaced with Ar. The raw material alloy of the diffusing material which has been coarse pulverized is sealed in a sealed container of which the atmosphere is replaced with Ar, and then this was further pulverized. Thereby, a diffusing material powder having an average particle size of 5 to 20 μm is obtained. Then, a slow oxidation treatment is carried out. Specifically, the air is slowly introduced into the sealed container of the Ar atmosphere. The reason of slow oxidation treatment is because if the powder is rapidly exposed to the air, there is a risk that the powder may catch fire.

Here, the diffusing material including Tb and at least one selected from the group consisting of Nd, Cu, Co, Pr, Al, and Ga may be more preferable than using the dispersing material including Tb only. The dispersing material may include Tb and at least one selected from the group consisting of Nd, Cu, Co, and Pr. A proportion of Tb in the diffusing material is not particularly limited. For example, it may be 50 parts by mass or more in 100 parts by mass of the diffusing material as a whole. The melting point of Tb alone is 1356° C. On the contrary to this, the alloy including Tb and at least one selected from the group consisting of Nd, Cu, Co, Pr, Al, and Ga has a lower melting point. For example, the melting point of Tb—Nd—Cu alloy varies depending on the proportion of each element, and it may be adjusted to 890° C. or lower. That is, when the diffusing material includes Tb and at least one selected from the group consisting of Nd, Cu, Co, Pr, Al, and Ga, the grain boundary diffusion can be carried out at a low temperature. Further, Nd, Cu, Co, Pr Al, and Ga are components which form the two-grain boundary phase. When the two-grain boundary phase prior to the grain boundary diffusion is extremely thin, the components which forms the two-grain boundary phase can be diffused efficiently. The two-grain boundary phase prior to the grain boundary diffusion of the R-T-B based permanent magnet according to the present embodiment is extremely thin, thus a content of the components forming the two-grain boundary phase is low. Hence, in case the diffusing material includes Tb and also the components which form the two-grain boundary phase, a concentration gradient is enlarged due to the difference between the concentrations of components which form the two-grain boundary phase included in the diffusing material and the concentrations of the components which form the two-grain boundary phase included in the two-grain boundary phase. Further, the concentration gradient of the components which form the two-grain boundary phase function as a driving force to swiftly diffuse the components which form the two-grain boundary phase. As a result, because of the extremely thin two-grain boundary phase prior to the grain boundary diffusion, the components which form the two-grain boundary phase are thought to diffuse efficiently. Further, the R-T-B based permanent magnet according to the present embodiment can attain a higher main phase volume fraction compared to a conventional R-T-B based permanent magnet. As a result, Hcj can be significantly improved while maintaining a high Br.

Further, if the grain boundary diffusion can be carried out at a low temperature, dissolving of the main phase grains while heat treating in the grain boundary diffusion step can be reduced. As a result, regarding the main phase grain having a core-shell structure after the grain boundary diffusion, the thickness of the shell including the diffusing material becomes thin. Hence, the concentration of Tb in the shell can be increased, and Hcj can be improved significantly.

Next, a binder resin and alcohol are added to the obtained diffusing material powder, and the obtained mixture is made into a paste using a ball mill, and a coating paste is thereby produced.

Next, the coating paste is applied on the sintered body before the grain boundary diffusion, however, an etching treatment may be carried out to the sintered body before the grain boundary diffusion before applying the coating paste. Then, the coating paste is applied on the sintered body after the etching treatment. The number of surfaces to which the coating paste is applied is not particularly limited. For example, the coating paste may be applied to all of the surfaces of the sintered body, or it may be applied to two surfaces which are facing against each other of the sintered body.

The diffusion treatment temperature during the grain boundary diffusion step according to the present embodiment may be within a range of 650° C. to 930° C. The diffusion treatment time may be 5 hours to 24 hours. Note that, the grain boundary diffusion step may function as the aforementioned aging treatment step.

Figure 3:
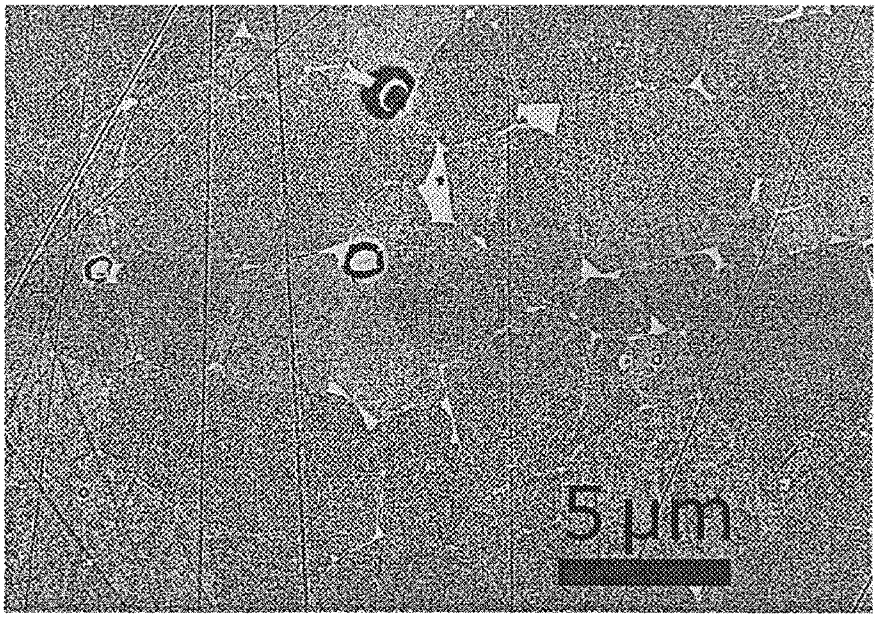
FIG. 3 is a SEM image of the R-T-B based permanent magnet after the grain boundary diffusion.

By setting the diffusion treatment temperature and the aging treatment time within the above-mentioned ranges, the production costs can be reduced, and a preferable Tb concentration distribution can be achieved. Note that, when using the metals other than Tb (for example, light rare earth elements (such as Nd, Pr, and so on), Cu, Co, Fe, Al, Ga, and Dy), preferable concentration distributions of said other metal elements tend to be achieved easily. Also note that the magnet shown in FIG. 3 can be obtained by performing the grain boundary diffusion step to the magnet shown in FIG. 2. As shown in FIG. 3, the two-grain boundary phase which is extremely thin in FIG. 2 has become thicker.

After the grain boundary diffusion, a further heat treatment may be carried out. In such case, the heat treatment temperature may be within a range of 480° C. to 680° C. The heat treatment time may be 0.5 hours to 3 hours. By going through such heat treatment, the magnetic properties, particularly of Hcj, of the R-T-B based permanent magnet obtained at the end can be further improved.

[Machining Step (after Grain Boundary Diffusion)]

After the grain boundary diffusion step, various machining of the R-T-B based permanent magnet may be carried out. The type of machining performed is not particularly limited. For example, shape processing such as cutting, and grinding, and chamfering processing such as barrel polishing may be carried out.

By magnetizing the R-T-B based permanent magnet according to the present embodiment obtained by the above-mentioned methods, an R-T-B based permanent magnet product is formed.

The R-T-B based permanent magnet according to the present embodiment obtained as such has desired properties. Specifically, the residual magnetic flux density Br and the coercivity Hcj are high, and excellent corrosion resistance and the production stability are obtained.

The R-T-B based permanent magnet according to the present embodiment may preferably be used for a motor, a generator, and so on. Also, the R-T-B based permanent magnet according to the present embodiment may preferably be used for an automobile including the motor.

Note that, the present invention is not particularly limited to the above-mentioned embodiment, and it may be modified within a scope of the present invention.

EXAMPLES

Hereinbelow, the present invention is further described based on examples, however the present invention is not limited thereto.

Experiment Example 1

(Production of R-T-B Based Sintered Magnet)

Nd, Pr, electrolytic iron, and a low-carbon ferro-boron alloy were prepared as raw material metals. Further, Al, Ga, Cu, Co, and Zr were prepared in a form of a pure metal or in a form of an alloy with Fe.

A raw material alloy was produced by a strip casting method using the raw materials so that the magnetic composition obtained at the end after the grain boundary diffusion satisfied the composition of each sample shown in Table 1. A content of each component shown in Table 1 was a content which is with respect to a total mass of a respective magnet. A content of Fe is indicated as a balance (bal.) since it is a remainder after impurities, which are not shown in the table, were removed. Each magnet included the impurities not shown in the table within a range which did not influence the magnetic properties, specifically, each magnet included 5 mass % or less impurities in a total. A thickness of the raw material alloy was 0.2 mm to 0.4 mm.

Next, hydrogen was stored in the raw material alloy by letting a hydrogen gas flow at room temperature for 1 hour. Then, the atmosphere was changed to Ar gas, and dehydrogenation was performed at a dehydrogenation temperature and a dehydrogenation time shown in Table 1 and Table 2 to carry out hydrogen storage pulverization (coarse pulverization) of the raw material alloy, thereby a coarse powder was obtained. Also, for each sample, a nitrogen gas concentration and an oxygen gas concentration in the atmosphere were adjusted so that proportions of O and N in the R-T-B based permanent magnet obtained at the end satisfied the proportions shown in Table 1. In each example and comparative example, the nitrogen gas concentration was adjusted roughly to 50 ppm or less, and the oxygen gas concentration was adjusted roughly to 50 ppm or less. Further, after cooling the coarse powder, a sieve was used to obtain a powder having a particle size of 425 μm or less. Note that, steps from hydrogen storage pulverization to sintering were constantly under a low-oxygen atmosphere with an oxygen concentration of less than 100 ppm. Note that, regarding the cooled coarse powder, the hydrogen content was measured using an inert gas fusion—non-dispersive infrared absorption method. Results are shown in Tables 1 and 2.

Next, oleic amide as a pulverization aid was added and mixed to the raw material alloy powder which was carried out with hydrogen storage pulverization and sieving so that the proportion of C in the R-T-B based permanent magnet obtained at the end satisfied the proportion shown in Table 1.

Next, a fine pulverization was carried out using a collision plate type jet mill, thereby a fine powder having an average particle size of 3.9 μm to 4.2 μm was obtained. Note that, the average particle size was an average particle size D50 measured using a laser diffraction type particle size analyzer.

The obtained fine powder was molded in a magnetic field to produce a molded body. The applied magnetic field was static magnetic field of 1200 kA/m. Also, the pressure while molding was 98 MPa. Note that, the direction of applied magnetic field and the direction of pressurization were perpendicular to each other. When the density of the molded body was measured, the density of each molded body was within a range between 4.10 $Mg/cm^3$ or more and 4.25 $Mg/m^3$ or less.

Next, the molded body was sintered to obtain a sintered body. Sintering conditions were adjusted depending on the compositions, and sintering was carried out at a temperature of 1040° C. to 1100° C. and for 5 hours, A sintering atmosphere was in vacuum. The density of the sintered body was within a range of 7.45 $Mg/m^3$ or more and 7.55 $Mg/m^3$ or less. Then, a first aging treatment was performed in Ar atmosphere under atmospheric pressure at a first aging treatment temperature of 900° C. for two hours; and a second aging treatment was performed in Ar atmosphere under atmospheric pressure at a second aging treatment temperature of 550° C. for two hours.

Then, the sintered body after the aging treatment was processed into a size of 12 mm×12 mm×4.5 mm (the direction of easy magnetization axis was 4.5 mm) using a vertical grinding machine, thereby a sintered body before the grain boundary diffusion was obtained.

A coating paste including Tb as a diffusing material was prepared separately from the sintered body before the grain boundary diffusion. In Experiment example 1, Tb was prepared as a raw material metal of the diffusing material. Next, the raw material metal of the diffusing material was melted by high frequency induction heating, then the obtained molten which was at a temperature of 1370° C. was quenched using a roll. Thereby, a raw material alloy of diffusing material as a quenched ribbon (raw material alloy 1 of the diffusing material) was prepared. The obtained quenched ribbon was coarsely pulverized under Ar atmosphere using a stamp mill made of stainless steel. Then, the coarsely pulverized raw material alloy of diffusing material was placed together with a stainless-made media into a sealed container of which the atmosphere was replaced by Ar, then pulverization was carried out using a ball mill. Thereby, a diffusing material powder having an average particle size of 10 μm to 20 μm was obtained. Next, a slow oxidation treatment was carried out. Specifically, the air was slowly introduced into the sealed container in a glovebox of Ar atmosphere. A slow oxidation treatment was carried out because if the powder was rapidly exposed to the air, there was a risk that the powder catches fire.

The binder resin (butyral fine powder) and alcohol were added to the produced diffusing material powder to produce a coating paste. Specifically, first, 2 parts by mass of the binder resin and 100 parts by mass of alcohol were added to 100 parts by mass of the diffusing material powder, and then mixed to produce a mixture. Next, while under Ar atmosphere, the obtained mixture was placed inside, a container with a cylinder shape lid made of resin, and the cover was closed. Then, the container was placed on a stand of a ball mill, then it was rotated to form a paste; thereby a coating paste was produced. A rotating time was 24 hours, and a rotational speed was 120 rpm.

Next, the coating paste was applied to the sintered body before the grain boundary diffusion. First, an etching treatment was performed to the sintered body before the grain boundary diffusion. During the etching treatment, the sintered body before the grain boundary diffusion was immersed for three minutes in a mixture solution of nitric acid and ethanol which contained 3 mass % of nitric acid to 100 mass % of ethanol, then the sintered body was immersed for one minute in ethanol. This process was repeated for twice. Then, the two surfaces each having a size of 12 mm×12 mm of the sintered body which was carried out with the etching treatment, and the coating paste was evenly applied. Also, the coating paste was applied so that the magnet composition obtained at the end satisfied the composition of each sample shown in Table 1.

After the coating paste was applied, it was dried and then a diffusion treatment was carried out for 10 hours at 950° C. while flowing Ar under atmospheric pressure, followed by a heat treatment for 2 hours at 550'C. Next, 0.1 mm was ground off per each face of the surface of the sample, thereby an R-T-B based sintered magnet of each sample shown in Table 1 and Table 2 was obtained. Note that, TRL represents the total content of the light rare earth elements (Nd and Pr), and TRE represents the total content of the rare earth elements (Nd, Pr, and Tb).

An average composition of the obtained R-T-B based sintered magnet was measured. An amount of each element was analyzed by pulverizing it using a stamp mill. Content of each element was measured using a fluorescence X-ray analysis. The content of boron (B) was measured using an ICP analysis. The content of oxygen was measured using an inert gas fusion—non-dispersive infrared absorption method. The content of carbon was measured using a combustion in oxygen stream-infrared absorption method. The content of nitrogen was measured using an inert gas fusion-thermal conductivity method. Results are shown in Table 1.

The magnetic properties of the sintered body before the grain boundary diffusion and the magnetic properties of the R-T-B based sintered magnet after the grain boundary diffusion were evaluated using a BH tracer. The magnetic properties were evaluated after magnetization was carried out using a pulse magnetic field of 4000 kA/m. Since the sintered magnet is thin, two sintered magnets were stacked for evaluation. Results are shown in Table 2. Note that, regarding the magnetic properties of the R-T-B based sintered magnet after the grain boundary diffusion, Br≥1485 mT and Hcj≥1800 kA/m were considered good, and Br≥1500 mT and Hcj≥1850 kA/m were considered even better. Also, difference of HcJ before and after the grain boundary diffusion is also indicated in Table 2.

Also, a main phase grain volume fraction after the grain boundary diffusion was measured. Specifically, the R-T-B based magnet after the grain boundary diffusion was cut and observed using a SEM, For observation using a SEM, the observation range was a size which included at least 200 main phase grains at magnification of 2500×. Then, an area fraction of the main phase grains observed in the observation range was considered equivalent of a main phase grain volume fraction, thereby the main phase grain volume fraction was obtained. Further, ten of such observation fields were set in different areas, and the main phase grain volume fraction of the observation field was measured, and then the average thereof was calculated. Results are shown in Table 2.

TABLE 1

| Sample No. | Example/Comp. example | H content after coarse pulverization ppm | Dehydro-genation Temp. ° C. | Dehydro-genation time min | Magnetic composition after grain boundary diffusion Nd mass % | Pr mass % | TRL mass % | Tb mass % | TRE mass % |
|---|---|---|---|---|---|---|---|---|---|
| 1 | Example | 3000 | 100 | 30 | 28.30 | 0.05 | 28.35 | 0.40 | 28.75 |
| 2 | Example | 3000 | 100 | 5 | 28.30 | 0.05 | 28.35 | 0.40 | 28.75 |
| 3 | Example | 3000 | 50 | 30 | 28.30 | 0.05 | 28.35 | 0.40 | 28.75 |
| 4 | Comparative example | 950 | 600 | 60 | 22.20 | 7.40 | 29.60 | 0.35 | 29.95 |
| 5 | Comparative example | 900 | 600 | 120 | 28.30 | 0.05 | 28.35 | 0.40 | 28.75 |
| 6 | Comparative example | 900 | 600 | 120 | 29.75 | 0.05 | 29.80 | 0.40 | 30.20 |

| Sample No. | Magnetic composition after grain boundary diffusion B mass % | Al mass % | Cu mass % | Ga mass % | Co mass % | Zr mass % | Fe mass % | O ppm | C ppm | N ppm |
|---|---|---|---|---|---|---|---|---|---|---|
| 1 | 0.96 | 0.06 | 0.10 | 0.00 | 0.00 | 0.20 | bal. | 640 | 630 | 470 |
| 2 | 0.96 | 0.06 | 0.10 | 0.00 | 0.00 | 0.20 | bal. | 640 | 630 | 210 |
| 3 | 0.96 | 0.06 | 0.10 | 0.00 | 0.00 | 0.20 | bal. | 630 | 450 | 470 |
| 4 | 0.93 | 0.20 | 0.20 | 0.20 | 2.00 | 0.15 | bal. | 500 | 900 | 500 |
| 5 | 0.96 | 0.06 | 0.10 | 0.00 | 0.00 | 0.20 | bal. | 790 | 810 | 630 |
| 6 | 0.96 | 0.06 | 0.10 | 0.00 | 0.00 | 0.20 | bal. | 810 | 830 | 620 |

TABLE 2

| Sample No. | Example/Comp. example | H content after coarse pulverization ppm | Dehydro-genation Temp. ° C. | Dehydro-genation time min | Main phase grain volume fraction after diffusion % | Magnetic properties before diffusion Br mT | Hcj kA/m | Magnetic properties after diffusion Br mT | Hcj kA/m | Hcj difference |
|---|---|---|---|---|---|---|---|---|---|---|
| 1 | Example | 3000 | 100 | 30 | 97.1 | 1530 | 720 | 1500 | 1820 | 1100 |
| 2 | Example | 3000 | 100 | 5 | 97.3 | 1535 | 725 | 1505 | 1850 | 1125 |
| 3 | Example | 3000 | 50 | 30 | 98.1 | 1530 | 725 | 1515 | 1850 | 1125 |
| 4 | Comparative example | 950 | 600 | 60 | 94.4 | 1475 | 1240 | 1460 | 1890 | 650 |
| 5 | Comparative example | 900 | 600 | 120 | 94.0 | 1475 | 640 | 1455 | 1490 | 850 |
| 6 | Comparative example | 900 | 600 | 120 | 91.1 | 1435 | 1095 | 1415 | 1790 | 695 |

According to Table 1, Examples of Sample Nos. 1 to 3 of which the dehydrogenation temperature and the dehydrogenation time were adjusted to increase the hydrogen content after the coarse pulverization showed good magnetic properties. Particularly, Sample No. 2 having low content of N and Sample No. 3 having low content of C showed even better magnetic properties. On the contrary to this, Comparative examples of Sample Nos. 4 to 6 of which the dehydrogenation temperature and the dehydrogenation time were adjusted to decrease the hydrogen content after the coarse pulverization showed poor magnetic properties.

Note that, for each of the R-T-B based sintered magnets of Examples and Comparative examples, a concentration distribution of Tb was analyzed using an Electron Probe Microanalyzer (EPMA) to verify that the concentration distribution of Tb decreased from the surface area to the inside of the magnet.

Experiment Example 2

The same procedures as Experiment example 1 were carried out in Experiment example 2 except for the following. Results are shown in Table 3 and Table 4. Note that, the parts referring to Table 1 in the section describing Experiment example 1 is replaced with Table 3; and the parts referring to Table 2 in the section describing Experiment example 1 is replaced with Table 4.

In Experiment example 2, the coating paste was changed from that used in Experiment example 1. In Experiment example 2, first, Tb, Nd, and Cu were each prepared in a single substance form as raw material metals of the diffusing material, Next, Tb, Nd, and Cu were weighed so that the raw material metals satisfied TbNd:Cu=68.8:15.8:15.6 in terms of a mass ratio. Then, the weighed raw material metals were melted in an arc melting furnace and then casted. This was repeated for three times. The obtained alloy was melted using high frequency induction heating, then the obtained molten at a temperature of 1300° C. was quenched using a roll to produce a raw material alloy of the diffusing material which was a quenched ribbon (a raw material alloy 2 of the diffusing material). The steps after this were the same as Experiment example 1, and the coating paste of Experiment example 2 was produced.

For the grain boundary diffusion, the coating paste was applied and dried, then while flowing Ar under atmospheric pressure at 900° C., the grain boundary diffusion was carried out for 10 hours. Then, heat treatment at 550° C. was performed for 2 hours.

TABLE 3

| Sample No. | Example/Comp. example | H content after coarse pulverization ppm | Dehydrogenation Temp. ° C. | Dehydrogenation time min | Magnetic composition after grain boundary diffusion Nd mass % | Pr mass % | TRL mass % | Tb mass % | TRE mass % |
|---|---|---|---|---|---|---|---|---|---|
| 11 | Example | 2600 | 100 | 30 | 28.30 | 0.05 | 28.35 | 0.40 | 28.75 |
| 12 | Example | 2600 | 100 | 30 | 28.30 | 0.05 | 28.35 | 0.40 | 28.75 |
| 13 | Example | 3000 | 100 | 5 | 28.30 | 0.05 | 28.35 | 0.40 | 28.75 |
| 14 | Example | 2100 | 200 | 30 | 28.30 | 0.05 | 28.35 | 0.40 | 28.75 |
| 15 | Example | 3100 | 50 | 30 | 28.30 | 0.05 | 28.35 | 0.40 | 28.75 |
| 16 | Example | 2400 | 100 | 120 | 28.30 | 0.05 | 28.35 | 0.40 | 28.75 |
| 17 | Example | 2200 | 100 | 600 | 28.30 | 0.05 | 28.35 | 0.40 | 28.75 |
| 18 | Example | 2600 | 200 | 5 | 28.30 | 0.05 | 28.35 | 0.40 | 28.75 |
| 19 | Comparative example | 2700 | 100 | 30 | 27.45 | 0.05 | 27.50 | 0.40 | 27.90 |
| 20 | Example | 2400 | 100 | 30 | 27.90 | 0.05 | 27.95 | 0.40 | 28.35 |
| 21 | Example | 2800 | 100 | 30 | 29.50 | 0.05 | 29.55 | 0.40 | 29.95 |
| 22 | Comparative example | 3200 | 100 | 30 | 29.75 | 0.05 | 29.80 | 0.40 | 30.20 |
| 23 | Example | 2600 | 100 | 30 | 28.30 | 0.05 | 28.35 | 0.65 | 29.00 |
| 24 | Comparative example | 3000 | 100 | 30 | 28.30 | 0.05 | 28.35 | 0.40 | 28.75 |
| 25 | Example | 2600 | 100 | 30 | 28.30 | 0.05 | 28.35 | 0.40 | 28.75 |
| 26 | Example | 2600 | 100 | 30 | 28.30 | 0.05 | 28.35 | 0.40 | 28.75 |
| 27 | Comparative example | 3000 | 100 | 30 | 28.30 | 0.05 | 28.35 | 0.40 | 28.75 |
| 28 | Comparative example | 3000 | 100 | 30 | 28.30 | 0.05 | 28.35 | 0.40 | 28.75 |
| 29 | Comparative example | 3000 | 100 | 30 | 28.30 | 0.05 | 28.35 | 0.40 | 28.75 |
| 30 | Example | 2600 | 100 | 30 | 28.30 | 0.05 | 28.35 | 0.40 | 28.75 |
| 31 | Example | 2600 | 100 | 30 | 28.30 | 0.05 | 28.35 | 0.40 | 28.75 |
| 32 | Example | 2600 | 100 | 30 | 28.30 | 0.05 | 28.35 | 0.40 | 28.75 |
| 33 | Example | 2700 | 100 | 30 | 21.70 | 6.80 | 28.50 | 0.40 | 28.90 |
| 34 | Example | 2600 | 100 | 30 | 28.30 | 0.05 | 28.35 | 0.40 | 28.75 |
| 35 | Example | 2600 | 100 | 30 | 28.30 | 0.05 | 28.35 | 0.40 | 28.75 |
| 36 | Example | 2600 | 100 | 30 | 28.30 | 0.05 | 28.35 | 0.40 | 28.75 |
| 37 | Example | 2600 | 100 | 30 | 28.30 | 0.05 | 28.35 | 0.40 | 28.75 |
| 38 | Example | 2600 | 100 | 30 | 28.30 | 0.05 | 28.35 | 0.40 | 28.75 |
| 39 | Comparative example | 2600 | 100 | 30 | 28.30 | 0.05 | 28.35 | 0.40 | 28.75 |
| 40 | Comparative example | 1100 | 500 | 120 | 28.30 | 0.05 | 28.35 | 0.40 | 28.75 |
| 41 | Comparative example | 900 | 600 | 120 | 28.30 | 0.05 | 28.35 | 0.40 | 28.75 |
| 42 | Comparative example | 3900 | No dehydrogenation | | 28.30 | 0.05 | 28.35 | 0.40 | 28.75 |
| 43 | Comparative example | 3900 | No dehydrogenation | | 26.95 | 4.75 | 31.70 | 0.40 | 32.10 |

| Sample No. | Magnetic composition after grain boundary diffusion B mass % | Al mass % | Cu mass % | Ga mass % | Co mass % | Zr mass % | Fe mass % | O ppm | C ppm | N ppm |
|---|---|---|---|---|---|---|---|---|---|---|
| 11 | 0.96 | 0.06 | 0.10 | 0.00 | 0.00 | 0.20 | bal. | 640 | 630 | 470 |
| 12 | 0.96 | 0.06 | 0.10 | 0.00 | 1.00 | 0.20 | bal. | 640 | 630 | 470 |
| 13 | 0.96 | 0.06 | 0.10 | 0.00 | 0.00 | 0.20 | bal. | 640 | 630 | 230 |
| 14 | 0.96 | 0.06 | 0.10 | 0.00 | 0.00 | 0.20 | bal. | 650 | 630 | 540 |
| 15 | 0.96 | 0.06 | 0.10 | 0.00 | 0.00 | 0.20 | bal. | 650 | 460 | 470 |
| 16 | 0.96 | 0.06 | 0.10 | 0.00 | 0.00 | 0.20 | bal. | 640 | 730 | 470 |
| 17 | 0.96 | 0.06 | 0.10 | 0.00 | 0.00 | 0.20 | bal. | 660 | 790 | 470 |
| 18 | 0.96 | 0.06 | 0.10 | 0.00 | 0.00 | 0.20 | bal. | 700 | 630 | 420 |
| 19 | 0.96 | 0.06 | 0.10 | 0.00 | 0.00 | 0.20 | bal. | 640 | 630 | 470 |
| 20 | 0.96 | 0.06 | 0.10 | 0.00 | 0.00 | 0.20 | bal. | 590 | 620 | 450 |
| 21 | 0.96 | 0.06 | 0.10 | 0.00 | 0.00 | 0.20 | bal. | 660 | 620 | 490 |
| 22 | 0.96 | 0.06 | 0.10 | 0.00 | 0.00 | 0.20 | bal. | 720 | 630 | 510 |
| 23 | 0.96 | 0.06 | 0.10 | 0.00 | 0.00 | 0.20 | bal. | 640 | 630 | 470 |
| 24 | 0.96 | 0.06 | 0.03 | 0.00 | 0.00 | 0.20 | bal. | 640 | 630 | 470 |
| 25 | 0.96 | 0.06 | 0.05 | 0.00 | 0.00 | 0.20 | bal. | 640 | 630 | 470 |
| 26 | 0.96 | 0.06 | 0.40 | 0.00 | 0.00 | 0.20 | bal. | 640 | 630 | 470 |
| 27 | 0.96 | 0.06 | 0.50 | 0.00 | 0.00 | 0.20 | bal. | 640 | 630 | 470 |
| 28 | 0.89 | 0.06 | 0.10 | 0.00 | 0.00 | 0.20 | bal. | 640 | 700 | 470 |
| 29 | 0.92 | 0.06 | 0.10 | 0.30 | 0.00 | 0.20 | bal. | 640 | 630 | 470 |
| 30 | 0.93 | 0.06 | 0.10 | 0.00 | 0.00 | 0.20 | bal. | 640 | 640 | 460 |
| 31 | 0.98 | 0.06 | 0.10 | 0.00 | 0.00 | 0.20 | bal. | 640 | 640 | 460 |
| 32 | 1.00 | 0.06 | 0.10 | 0.00 | 0.00 | 0.20 | bal. | 640 | 610 | 480 |
| 33 | 0.96 | 0.06 | 0.10 | 0.00 | 0.00 | 0.20 | bal. | 640 | 630 | 470 |

TABLE 3-continued

| | | | | | | | | | | |
|---|---|---|---|---|---|---|---|---|---|---|
| 34 | 0.96 | 0.06 | 0.10 | 0.00 | 0.00 | 0.05 | bal. | 640 | 630 | 470 |
| 35 | 0.96 | 0.06 | 0.10 | 0.00 | 0.00 | 0.10 | bal. | 640 | 630 | 470 |
| 36 | 0.96 | 0.06 | 0.10 | 0.00 | 0.00 | 0.25 | bal. | 640 | 630 | 470 |
| 37 | 0.96 | 0.06 | 0.10 | 0.00 | 0.00 | 0.40 | bal. | 630 | 640 | 470 |
| 38 | 0.96 | 0.06 | 0.10 | 0.05 | 0.00 | 0.20 | bal. | 640 | 630 | 470 |
| 39 | 0.96 | 0.06 | 0.10 | 0.10 | 0.00 | 0.20 | bal. | 640 | 750 | 470 |
| 40 | 0.96 | 0.06 | 0.10 | 0.00 | 0.00 | 0.20 | bal. | 780 | 820 | 620 |
| 41 | 0.96 | 0.06 | 0.10 | 0.00 | 0.00 | 0.20 | bal. | 790 | 810 | 630 |
| 42 | 0.96 | 0.06 | 0.10 | 0.00 | 0.00 | 0.20 | bal. | 750 | 640 | 320 |
| 43 | 1.01 | 0.30 | 0.10 | 0.00 | 1.00 | 0.20 | bal. | 1020 | 680 | 550 |

TABLE 4

| Sample No. | Example/Comp. example | H content after coarse pulverization ppm | Dehydro-genation Temp. ° C. | Dehydro-genation time min | Main phase grain volume fraction after diffusion % | Magnetic properties before diffusion Br mT | Magnetic properties before diffusion Hcj kA/m | Magnetic properties after diffusion Br mT | Magnetic properties after diffusion Hcj kA/m | Hcj difference |
|---|---|---|---|---|---|---|---|---|---|---|
| 11 | Example | 2600 | 100 | 30 | 98.1 | 1530 | 720 | 1515 | 1870 | 1150 |
| 12 | Example | 2600 | 100 | 30 | 98.1 | 1540 | 720 | 1525 | 1870 | 1150 |
| 13 | Example | 3000 | 100 | 5 | 98.5 | 1535 | 735 | 1520 | 1895 | 1160 |
| 14 | Example | 2100 | 200 | 30 | 96.4 | 1530 | 720 | 1490 | 1875 | 1155 |
| 15 | Example | 3100 | 50 | 30 | 98.9 | 1540 | 730 | 1530 | 1875 | 1145 |
| 16 | Example | 2400 | 100 | 120 | 97.8 | 1530 | 720 | 1510 | 1870 | 1150 |
| 17 | Example | 2200 | 100 | 600 | 96.4 | 1530 | 720 | 1490 | 1845 | 1125 |
| 18 | Example | 2600 | 200 | 5 | 96.1 | 1520 | 715 | 1485 | 1845 | 1130 |
| 19 | Comparative example | 2700 | 100 | 30 | 96.3 | 1525 | 505 | 1490 | 1460 | 955 |
| 20 | Example | 2400 | 100 | 30 | 99.1 | 1550 | 655 | 1540 | 1825 | 1170 |
| 21 | Example | 2800 | 100 | 30 | 96.1 | 1525 | 875 | 1485 | 1875 | 1000 |
| 22 | Comparative example | 3200 | 100 | 30 | 92.0 | 1450 | 1105 | 1425 | 1840 | 735 |
| 23 | Example | 2600 | 100 | 30 | 96.8 | 1530 | 720 | 1495 | 1955 | 1235 |
| 24 | example | 3000 | 100 | 30 | 95.2 | 1500 | 685 | 1475 | 1745 | 1060 |
| 25 | Example | 2600 | 100 | 30 | 96.4 | 1530 | 680 | 1490 | 1810 | 1130 |
| 26 | Example | 2600 | 100 | 30 | 96.8 | 1530 | 790 | 1495 | 1880 | 1090 |
| 27 | Comparative example | 3000 | 100 | 30 | 93.1 | 1475 | 835 | 1445 | 1820 | 985 |
| 28 | Comparative example | 3000 | 100 | 30 | 90.6 | 1420 | 830 | 1405 | 1790 | 960 |
| 29 | Comparative example | 3000 | 100 | 30 | 92.0 | 1440 | 1035 | 1425 | 1820 | 785 |
| 30 | Example | 2600 | 100 | 30 | 96.1 | 1520 | 690 | 1485 | 1820 | 1130 |
| 31 | Example | 2600 | 100 | 30 | 98.0 | 1530 | 770 | 1515 | 1880 | 1110 |
| 32 | Example | 2600 | 100 | 30 | 96.1 | 1520 | 810 | 1485 | 1820 | 1010 |
| 33 | Example | 2700 | 100 | 30 | 96.8 | 1525 | 780 | 1495 | 1875 | 1095 |
| 34 | Example | 2600 | 100 | 30 | 98.3 | 1535 | 680 | 1520 | 1800 | 1120 |
| 35 | Example | 2600 | 100 | 30 | 98.4 | 1535 | 720 | 1520 | 1840 | 1120 |
| 36 | Example | 2600 | 100 | 30 | 97.0 | 1520 | 740 | 1500 | 1865 | 1125 |
| 37 | Example | 2600 | 100 | 30 | 96.1 | 1520 | 720 | 1485 | 1830 | 1110 |
| 38 | Example | 2600 | 100 | 30 | 96.2 | 1510 | 735 | 1485 | 1850 | 1115 |
| 39 | Comparative example | 2600 | 100 | 30 | 92.0 | 1455 | 895 | 1430 | 1825 | 930 |
| 40 | Comparative example | 1100 | 500 | 120 | 94.1 | 1480 | 645 | 1460 | 1540 | 895 |
| 41 | Comparative example | 900 | 600 | 120 | 94.0 | 1475 | 640 | 1455 | 1535 | 895 |
| 42 | Comparative example | 3900 | No dehydrogenation | | 95.1 | 1485 | 715 | 1475 | 1710 | 995 |
| 43 | Comparative example | 3900 | No dehydrogenation | | 89.9 | 1415 | 1080 | 1405 | 1735 | 655 |

According to Table 3 and Table 4, all of Examples showed good magnetic properties. On the contrary to this, Br and/or Hcj were lowered in, Sample No. 19 in which the total content of the rare earth elements was too low, Sample Nos. 22 and 43 in which the total content of the rare earth elements was too high, Sample No. 24 in which the content of Cu was too low, Sample No. 27 in which the content of Cu was too high, Sample Nos. 28 and 29 in which the content of B was too low, and Sample No. 39 in which the content of Ga and the content of C were relatively high. Also, the main phase grain volume fraction after the grain boundary diffusion was small and the difference of Hcj between before and after the grain boundary diffusion was small, when the total content of the rare earth elements was too high, when the content of Cu was too high, when the content of B was too low, or when the content of Ga and the content of C were relatively high. The magnetic properties were compromised in Sample Nos. 40 and 41 as Comparative examples of which the dehydrogenation temperature and the dehydrogenation time were adjusted so that the hydrogen content after the coarse pulverization was low. Also, Sample Nos. 42 and 43 in which the dehydrogenation treatment was not carried out showed cracks during sintering. This is thought to be caused since the hydrogen content after the coarse grinding was too high.

Note that, for all of the R-T-B based sintered magnet of Examples and Comparative examples, the concentration distribution of Tb, the concentration distribution of Nd, and the concentration distribution of Cu were analyzed using an Electron Probe Microanalyzer (EPMA). According to the results, it was confirmed that the concentration distribution of Tb, the concentration distribution of Nd, and the concentration distribution of Cu all decreased from the surface area towards the inside of the magnet.

Experiment Example 3

In Experiment example 3, the same procedures as Experiment example 2 were carried out except for the following, Results are shown in Tables 6 to 9. Note that, the parts referring to Table 3 in the section describing Experiment example 2 is replaced by Tables 6 and 8; and the parts referring to Table 3 in the section describing Experiment example 2 is replaced by Tables 7 and 9. Also, TRE represents a total content of the rare earth elements (Nd, Pr, Tb, and Dy).

In Experiment example 3, first, the heavy rare earth elements, the light rare earth elements, the metal elements shown in Table 5 were each prepared in a single substance form as the raw material metals of the diffusing material. Next, the raw material metals of the diffusing material were weighed so to satisfy a mass ratio shown in Table 5. Further, the weighed raw material metals were melted in an arc melting furnace, and then casted. This was repeated for three times. The obtained alloy was melted using high frequency induction heating, then the obtained molten at a temperature of 1300° C. was quenched using a roll to produce a raw material alloy of the diffusing material which was a quenched ribbon (raw material alloys 3 to 12 of the diffusing material). The steps after this were the same as Experiment example 2, and the coating paste of Experiment example 3 was produced.

TABLE 5

| | Composition of raw material alloy of diffusing material (mass %) | | | | | | | |
|---|---|---|---|---|---|---|---|---|
| | Heavy rare earth element | | Light rare earth element | | Metal element | | | |
| | Tb | Dy | Nd | Pr | Cu | Al | Co | Ga |
| Raw material alloy 1 of diffusing material | 100 | 0.0 | 0.0 | 0.0 | 0.0 | 0.0 | 0.0 | 0.0 |
| Raw material alloy 2 of diffusing material | 68.8 | 0.0 | 15.6 | 0.0 | 15.5 | 0.0 | 0.0 | 0.0 |
| Raw material alloy 3 of diffusing material | 68.8 | 0.0 | 0.0 | 15.6 | 15.6 | 0.0 | 0.0 | 0.0 |
| Raw material alloy 4 of diffusing material | 78.1 | 0.0 | 17.7 | 0.0 | 0.0 | 4.1 | 0.0 | 0.0 |
| Raw material alloy 5 of diffusing material | 78.4 | 0.0 | 0.0 | 17.4 | 0.0 | 4.2 | 0.0 | 0.0 |
| Raw material alloy 6 of diffusing material | 75.7 | 0.0 | 16.7 | 0.0 | 0.0 | 0.0 | 7.7 | 0.0 |
| Raw material alloy 7 of diffusing material | 76.0 | 0.0 | 0.0 | 16.3 | 0.0 | 0.0 | 7.7 | 0.0 |
| Raw material alloy 8 of diffusing material | 74.6 | 0.0 | 16.4 | 0.0 | 0.0 | 0.0 | 0.0 | 8.9 |
| Raw material alloy 9 of diffusing material | 74.9 | 0.0 | 0.0 | 16.1 | 0.0 | 0.0 | 0.0 | 9.0 |
| Raw material alloy 10 of diffusing material | 0.0 | 69.9 | 15.5 | 0.0 | 14.6 | 0.0 | 0.0 | 0.0 |
| Raw material alloy 11 of diffusing material | 85.4 | 0.0 | 0.0 | 0.0 | 14.6 | 0.0 | 0.0 | 0.0 |
| Raw material aiioy 12 of diffusing material | 91.2 | 0.0 | 0.0 | 0.0 | 0.0 | 0.0 | 0.0 | 8.8 |

In Experiment example 3, application of the coating paste was adjusted so that the total content of the heavy rare earth elements adhering to the sintered body before the grain boundary diffusion was 0.6 parts by mass with respect to 100 parts by mass of the sintered body before the grain boundary diffusion.

Regarding the magnetic properties after the grain boundary diffusion of Tb, the magnetic properties satisfying Br≥1485 mT and Hcj≥1800 kA/m were considered good; and Br≥1500 mT and Hcj≥1850 kA/m were considered even better. Regarding the magnetic properties after the grain boundary diffusion of Dy, Br≥1485 mT and Hcj≥1400 kA/m were considered good.

TABLE 7

| Sample No. | Example/Comp. example | H content after coarse pulverization ppm | Dehydro-genation Temp. T | Dehydro-genation time min | Main phase grain volume fraction after diffusion % | Magnetic properties before diffusion Br mT | Hcj k A/m | Magnetic properties after diffusion Br mT | Hcj kA/m | Hcj difference |
|---|---|---|---|---|---|---|---|---|---|---|
| 11 | Example | 2600 | 100 | 30 | 93.1 | 1530 | 720 | 1515 | 1870 | 1150 |
| 44 | Example | 2600 | 100 | 30 | 97.5 | 1530 | 720 | 1505 | 1915 | 1195 |
| 45 | Example | 2600 | 100 | 30 | 97.1 | 1530 | 720 | 1500 | 1845 | 1125 |
| 46 | Example | 2600 | 100 | 30 | 97.5 | 1530 | 720 | 1505 | 1855 | 1135 |
| 47 | Example | 2600 | 100 | 30 | 97.8 | 1530 | 720 | 1510 | 1830 | 1110 |
| 48 | Example | 2600 | 100 | 30 | 97.1 | 1530 | 720 | 1500 | 1845 | 1125 |
| 49 | Example | 2600 | 100 | 30 | 97.0 | 1530 | 720 | 1500 | 1900 | 1180 |
| 50 | Example | 2600 | 100 | 30 | 97.1 | 1530 | 720 | 1500 | 1925 | 1205 |
| 52 | Example | 2600 | 100 | 30 | 98.1 | 1530 | 720 | 1515 | 1835 | 1115 |
| 53 | Example | 2600 | 100 | 30 | 98.0 | 1530 | 720 | 1515 | 1870 | 1150 |
| 54 | Comparative example | 900 | 900 | 600 | 94.2 | 1475 | 640 | 1455 | 1550 | 910 |
| 55 | Comparative example | 900 | 900 | 600 | 93.9 | 1475 | 640 | 1450 | 1555 | 915 |
| 56 | Comparative example | 900 | 900 | 600 | 94.2 | 1475 | 640 | 1455 | 1560 | 920 |
| 57 | Comparative example | 900 | 900 | 600 | 94.9 | 1475 | 640 | 1465 | 1545 | 905 |
| 58 | Comparative example | 900 | 900 | 600 | 94.9 | 1475 | 540 | 1465 | 1555 | 915 |
| 59 | Comparative example | 900 | 900 | 600 | 92.6 | 1475 | 640 | 1430 | 1585 | 945 |
| 60 | Comparative example | 900 | 900 | 600 | 92.6 | 1475 | 640 | 1430 | 1595 | 955 |
| 62 | Comparative example | 900 | 900 | 600 | 94.9 | 1475 | 640 | 1465 | 1515 | 875 |
| 63 | Comparative example | 900 | 900 | 600 | 94.9 | 1475 | 640 | 1465 | 1565 | 925 |

TABLE 6

| Sample No | Example/Comp. example | Raw material alloy of diffusing material Type | H content after coarse pulverization ppm | Dehydro-genation Temp ° C. | Dehydro-genation time min | Magnetic composition after grain boundary diffusion Nd mass % | Pr mass % | TRL mass % | Tb mass % |
|---|---|---|---|---|---|---|---|---|---|
| 11 | Example | Raw material alloy 2 of diffusing material | 2600 | 100 | 30 | 28.30 | 0.05 | 28.35 | 0.40 |
| 44 | Example | Raw material alloy 3 of diffusing material | 2600 | 100 | 30 | 28.25 | 0.15 | 28.40 | 0.45 |
| 45 | Example | Raw material alloy 4 of diffusing material | 2600 | 100 | 30 | 28.30 | 0.05 | 28.35 | 0.40 |
| 46 | Example | Raw material alloy 5 of diffusing material | 2600 | 100 | 30 | 28.25 | 0.15 | 28.40 | 0.45 |
| 47 | Example | Raw material alloy 6 of diffusing material | 2600 | 100 | 30 | 28.30 | 0.05 | 28.35 | 0.40 |
| 48 | Example | Raw material alloy 7 of diffusing material | 2600 | 100 | 30 | 28.25 | 0.15 | 28.40 | 0.40 |
| 49 | Example | Raw material alloy 8 of diffusing material | 2600 | 100 | 30 | 28.30 | 0.05 | 28.35 | 0.45 |
| 50 | Example | Raw material alloy 9 of diffusing material | 2600 | 100 | 30 | 28.25 | 0.15 | 28.40 | 0.50 |
| 52 | Example | Raw material alloy 11 of diffusing material | 2600 | 100 | 30 | 28.25 | 0.05 | 28.30 | 0.35 |
| 53 | Example | Raw material alloy 12 of diffusing material | 2600 | 100 | 30 | 28.25 | 0.05 | 28.30 | 0.40 |
| 54 | Comparative example | Raw material alloy 3 of diffusing material | 900 | 600 | 120 | 28.25 | 0.15 | 28.40 | 0.30 |

TABLE 6-continued

| | | | | | | | | | |
|---|---|---|---|---|---|---|---|---|---|
| 55 | Comparative example | Raw material alloy 4 of diffusing material | 900 | 600 | 120 | 28.30 | 0.05 | 28.35 | 0.30 |
| 56 | Comparative example | Raw material alloy 5 of diffusing material | 900 | 600 | 120 | 28.25 | 0.15 | 28.40 | 0.30 |
| 57 | Comparative example | Raw material alloy 6 of diffusing material | 900 | 600 | 120 | 28.30 | 0.05 | 28.35 | 0.30 |
| 58 | Comparative example | Raw material alloy 7 of diffusing material | 900 | 600 | 120 | 28.25 | 0.15 | 28.40 | 0.30 |
| 59 | Comparative example | Raw material alloy 8 of diffusing material | 900 | 600 | 120 | 28.30 | 0.05 | 28.35 | 0.30 |
| 60 | Comparative example | Raw material alloy 9 of diffusing material | 900 | 600 | 120 | 28.25 | 0.15 | 28.40 | 0.30 |
| 62 | Comparative example | Raw material alloy 11 of diffusing material | 900 | 600 | 120 | 28.25 | 0.05 | 28.30 | 0.30 |
| 63 | Comparative example | Raw material alloy 12 of diffusing material | 900 | 600 | 120 | 28.25 | 0.05 | 28.30 | 0.30 |

| | Magnetic composition after grain boundary diffusion | | | | | | | | | | |
|---|---|---|---|---|---|---|---|---|---|---|---|
| Sample No | Dy mass % | TRE mass % | B mass % | Al mass % | Cu mass % | Ga mass % | Co mass % | Zr mass % | Fe mass % | O ppm | C ppm | N ppm |
| 11 | 0.00 | 28.75 | 0.96 | 0.06 | 0.10 | 0.00 | 0.00 | 0.20 | bal. | 640 | 630 | 470 |
| 44 | 0.00 | 28.85 | 0.96 | 0.06 | 0.20 | 0.00 | 0.00 | 0.20 | bal. | 640 | 630 | 470 |
| 45 | 0.00 | 28.75 | 0.96 | 0.08 | 0.10 | 0.00 | 0.00 | 0.20 | bal. | 640 | 630 | 470 |
| 46 | 0.00 | 28.85 | 0.96 | 0.10 | 0.10 | 0.00 | 0.00 | 0.20 | bal. | 640 | 630 | 470 |
| 47 | 0.00 | 28.75 | 0.96 | 0.06 | 0.10 | 0.00 | 0.10 | 0.20 | bal. | 640 | 630 | 470 |
| 48 | 0.00 | 28.80 | 0.96 | 0.06 | 0.10 | 0.00 | 0.10 | 0.20 | bal. | 640 | 630 | 470 |
| 49 | 0.00 | 28.80 | 0.96 | 0.06 | 0.10 | 0.10 | 0.00 | 0.20 | bal. | 640 | 630 | 470 |
| 50 | 0.00 | 28.90 | 0.96 | 0.06 | 0.10 | 0.15 | 0.00 | 0.20 | bal. | 640 | 630 | 470 |
| 52 | 0.00 | 28.65 | 0.96 | 0.06 | 0.10 | 0.00 | 0.00 | 0.20 | bal. | 640 | 630 | 470 |
| 53 | 0.00 | 28.70 | 0.96 | 0.06 | 0.10 | 0.10 | 0.00 | 0.20 | bal. | 640 | 630 | 470 |
| 54 | 0.00 | 28.70 | 0.96 | 0.06 | 0.15 | 0.00 | 0.00 | 0.20 | bal. | 790 | 810 | 630 |
| 55 | 0.00 | 28.65 | 0.96 | 0.06 | 0.10 | 0.00 | 0.00 | 0.20 | bal. | 790 | 810 | 630 |
| 56 | 0.00 | 28.70 | 0.96 | 0.07 | 0.10 | 0.00 | 0.00 | 0.20 | bal. | 790 | 810 | 630 |
| 57 | 0.00 | 28.65 | 0.96 | 0.06 | 0.10 | 0.00 | 0.05 | 0.20 | bal. | 790 | 810 | 630 |
| 58 | 0.00 | 28.70 | 0.96 | 0.06 | 0.10 | 0.00 | 0.05 | 0.20 | bal. | 790 | 810 | 630 |
| 59 | 0.00 | 28.65 | 0.96 | 0.06 | 0.10 | 0.05 | 0.00 | 0.20 | bal. | 790 | 810 | 630 |
| 60 | 0.00 | 28.70 | 0.96 | 0.06 | 0.10 | 0.10 | 0.00 | 0.20 | bal. | 790 | 810 | 630 |
| 62 | 0.00 | 28.60 | 0.96 | 0.06 | 0.10 | 0.00 | 0.00 | 0.20 | bal. | 790 | 810 | 630 |
| 63 | 0.00 | 28.60 | 0.96 | 0.06 | 0.10 | 0.05 | 0.00 | 0.20 | bal. | 790 | 810 | 630 |

TABLE 8

| Sample No. | Example/Comp. example | Raw material alloy of diffusing material Tyoe | H content after coarse pulverization ppm | Dehydro-genation Temp. ° C. | Dehydro-genation time min | Magnetic composition after grain boundary diffusion | | | |
|---|---|---|---|---|---|---|---|---|---|
| | | | | | | Nd mass % | Pc mass % | TRI mass % | Tb mass % |
| 51 | Example | Raw material alloy 10 of diffusing material | 2600 | 100 | 30 | 28.30 | 0.05 | 28.35 | 0.00 |
| 61 | Comparative example | Raw material alloy 10 of diffusing material | 900 | 600 | 120 | 28.30 | 0.05 | 28.35 | 0.00 |

| | Magnetic composition after grain boundary diffusion | | | | | | | | | | |
|---|---|---|---|---|---|---|---|---|---|---|---|
| Sample No. | Dy mass % | TRE mass % | B mass % | Al mass % | Cu mass % | Ga mass % | Co mass % | Zr mass % | Fe mass % | O ppm | C ppm | N ppm |
| 51 | 0.40 | 28.75 | 0.96 | 0.06 | 0.10 | 0.00 | 0.00 | 0.20 | bal. | 640 | 630 | 470 |
| 61 | 0.30 | 28.65 | 0.96 | 0.06 | 0.10 | 0.00 | 0.00 | 0.20 | bal. | 790 | 810 | 630 |

TABLE 9

| Sample No. | Example/Comp. example | H content after coarse pulverization ppm | Dehydro-genation Temp. ° C. | Dehydro-genation time min | Main phase grain volume fraction after diffusion % | Magnetic properties before diffusion Br mT | Hcj k A/m | Magnetic properties after diffusion Br mT | Hcj kA/m | Hcj difference |
|---|---|---|---|---|---|---|---|---|---|---|
| 51 | Example | 2500 | 100 | 30 | 97.8 | 1530 | 720 | 1510 | 1440 | 720 |
| 61 | Comparative example | 900 | 900 | 600 | 94.9 | 1475 | 640 | 1465 | 2220 | 480 |

Table 6 and Table 7 show Examples and Comparative examples of which Tb was diffused, but. Sample Nos. 44 to 50, 52, and 53 showed good magnetic properties as the dehydrogenation temperature and the dehydrogenation time were adjusted so that the hydrogen content after the coarse pulverization was sufficiently high.

On the contrary to this, even though Tb was diffused as similar to Sample Nos. 44 to 50, 52, and 53, Sample Nos. 54 to 60, 62, and 63 as Comparative examples showed poor magnetic properties since the dehydrogenation temperature and the dehydrogenation time were adjusted so that the hydrogen content after the coarse pulverization was low.

Sample No. 51 showed good magnetic properties as the dehydrogenation temperature and the dehydrogenation time were adjusted so that the hydrogen content after the coarse pulverization was sufficiently high. On the contrary to this, even though Dy was diffused as similar to Sample No. 51, Sample No. 61 showed poor magnetic properties since the dehydrogenation temperature and the dehydrogenation time were adjusted so that the hydrogen content after the coarse pulverization was low.

Note that, regarding all of the R-T-B based sintered magnets of Examples and Comparative examples, the concentration distributions of elements included in the raw material alloy of the diffusing material were analyzed using an Electron Probe Microanalyzer (EPMA). As a result, it was confirmed that the concentration distributions of the metal elements included in the raw material alloy of the diffusing material decreased from the surface area toward the inside of the magnet.

NUMERICAL REFERENCES

1 . . . R-T-B based permanent magnet

What is claimed is:

1. An R-T-B based permanent magnet in which R represents one or more rare earth elements which essentially includes Tb or Dy, T represents one or more iron group elements which essentially includes Fe or a combination of Fe and Co, and B represents boron; wherein the R-T-B based permanent magnet further includes Cu, a total content of R is within a range of 28.35 mass % or more and 29.95 mass % or less, a content of Cu is within a range of 0.05 mass % or more and 0.40 mass % or less, a content of B is within a range of 0.93 mass % or more and 1.00 mass % or less, a content of Ga is within a range of 0 mass % or more and 0.05 mass % or less, a concentration distribution of Tb or Dy decreases from a surface area towards an inside of the R-T-B based permanent magnet, a residual magnetic flux density is 1485 mT or more, the residual magnetic flux density being measured after a grain boundary diffusion process, and a coercivity is 1800 kA/m or more.

2. The R-T-B based permanent magnet according to claim 1, wherein R represents one or more rare earth elements which essentially includes Tb.

3. The R-T-B based permanent magnet according to claim 1 comprising C in a content of less than 750 ppm.

4. The R-T-B based permanent magnet according to claim 1 comprising N in a content of less than 500 ppm.

5. The R-T-B based permanent magnet according to claim 1 comprising O in a content of less than 650 ppm.

6. The R-T-B based permanent magnet according to claim 1, wherein one or more light rare earth elements are included as R, and a concentration distribution of the one or more light rare earth elements decreases from the surface area towards the inside of the R-T-B based permanent magnet.

7. The R-T-B based permanent magnet according to claim 1, wherein a concentration distribution of Cu decreases from the surface area towards the inside of the R-T-B based permanent magnet.

8. The R-T-B based permanent magnet according to claim 1, wherein the R-T-B based permanent magnet further includes Al, and a concentration distribution of Al decreases from the surface area towards the inside of the R-T-B based permanent magnet.

9. The R-T-B based permanent magnet according to claim 1, wherein the R-T-B based permanent magnet further includes Co, and a concentration distribution of Co decreases from the surface area towards the inside of the R-T-B based permanent magnet.

10. The R-T-B based permanent magnet according to claim 1, wherein the R-T-B based permanent magnet further includes Ga, and a concentration distribution of Ga decreases from the surface area towards the inside of the R-T-B based permanent magnet.

11. A motor comprising the R-T-B based permanent magnet according to claim 1.

12. An automobile comprising the motor according to claim 11.

13. A method for producing the R-T-B based permanent magnet of claim 1 comprising:

storing hydrogen to a raw material alloy, and dehydrogenating the raw material alloy storing hydrogen; in which the raw material alloy storing hydrogen is dehydrogenated under a dehydrogenating temperature within a range of 50° C. or higher and 200° C. or lower for a dehydrogenating time of 5 minutes or longer and 600 minutes or shorter.

14. The method for producing the R-T-B based permanent magnet according to claim 13, wherein 2100 ppm or more and 3100 ppm or less of H is included in a coarse magnetic powder obtained by dehydrogenation the raw material alloy storing hydrogen.

* * * * *